United States Patent
Ito et al.

(10) Patent No.: US 11,422,041 B2
(45) Date of Patent: *Aug. 23, 2022

(54) THERMAL ANALYSIS APPARATUS (71) Applicant: HITACHI HIGH-TECH SCIENCE CORPORATION, Tokyo (JP)

(72) Inventors: Susumu Ito, Tokyo (JP); Eita Shimoda, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 16/888,168

(22) Filed: May 29, 2020

(65) Prior Publication Data
US 2020/0400510 A1    Dec. 24, 2020

(30) Foreign Application Priority Data

Jun. 19, 2019  (JP) .............................. JP2019-113577
Mar. 24, 2020  (JP) .............................. JP2020-052663

(51) Int. Cl.
*G01K 11/12*     (2021.01)
*G01N 25/00*     (2006.01)

(52) U.S. Cl.
CPC .............. *G01K 11/12* (2013.01); *G01N 25/00* (2013.01)

(58) Field of Classification Search
CPC ................................. G01K 11/12; G01N 25/00
See application file for complete search history.

(56) References Cited

U.S. PATENT DOCUMENTS 4,156,365 A * 5/1979 Heinmets ........... A47G 19/2227
                                                374/E11.018
5,439,291 A * 8/1995 Reading ............. G01N 25/4866
                                                    374/33

(Continued)

FOREIGN PATENT DOCUMENTS

JP    2015108540 A    6/2015

OTHER PUBLICATIONS

Rigaku homepage, "Press releases," "Rigaku launches new software optimized for sample-observing TG-DTA and DSC," [published online], released as of May 11, 2016, Internet <URL: https://www.rigaku.co.jp/rigaku.com/arrival/160511.html (last accessed May 29, 2020).

*Primary Examiner* — Nathaniel T Woodward
*Assistant Examiner* — Philip L Cotey
(74) *Attorney, Agent, or Firm* — Holland & Hart LLP (57) ABSTRACT

The thermal analysis apparatus configured to measure thermal behavior accompanying a temperature change of a sample in a heating furnace, includes: the heating furnace having an opening, through which the sample is observable; a thermal behavior measurement unit for measuring the thermal behavior; an imaging unit for capturing image data of the sample in the heating furnace through the opening; a storage unit for storing the thermal behavior and the image data with respect to a temperature; a control unit; and an image processing unit for generating predetermined color information based on the image data, the control unit being configured to instruct the image processing unit to generate the predetermined color information with respect to a plurality of temperatures, and cause a predetermined display unit to display a plurality of pieces of the predetermined color information and the thermal behavior in superimposition with respect to the plurality of temperatures.

6 Claims, 8 Drawing Sheets

(56) References Cited

U.S. PATENT DOCUMENTS

| | | | | |
|---|---|---|---|---|
| 8,407,616 B2* | 3/2013 | Bergstrom | ............. | G06T 19/00 |
| | | | | 702/132 |
| 9,033,574 B2* | 5/2015 | Nagasawa | ................ | G01N 5/00 |
| | | | | 374/10 |
| 2008/0025367 A1* | 1/2008 | Nakatani | ................ | G01N 25/72 |
| | | | | 374/45 |
| 2010/0260374 A1* | 10/2010 | Akashi | ................. | G06T 7/0004 |
| | | | | 382/100 |
| 2010/0333059 A1* | 12/2010 | Tsujimura | ............ | G06F 30/398 |
| | | | | 716/136 |
| 2011/0054829 A1* | 3/2011 | Yamada | ............. | G01N 25/4866 |
| | | | | 702/136 |
| 2011/0170095 A1* | 7/2011 | Menard | ............. | G01N 25/4833 |
| | | | | 356/301 |
| 2013/0235899 A1* | 9/2013 | Nagasawa | ............. | G01N 5/00 |
| | | | | 374/14 |
| 2015/0153292 A1* | 6/2015 | Nishimura | .............. | G01N 5/00 |
| | | | | 374/12 |
| 2015/0264277 A1* | 9/2015 | Nishimura | .............. | G06F 1/206 |
| | | | | 348/164 |
| 2019/0025123 A1* | 1/2019 | Sakuta | ................. | G09G 3/2003 |
| 2019/0050866 A1* | 2/2019 | Wang | ............... | G06Q 20/40145 |
| 2021/0302342 A1* | 9/2021 | Yamazaki | ............. | G01K 17/00 |

* cited by examiner

THERMAL ANALYSIS APPARATUS

The present application claims priorities to Japanese Patent Application No. 2019-113577, filed Jun. 19, 2019 and Japanese Patent Application No. 2020-052663, filed Mar. 24, 2020, the entire contents of each of which is incorporated herein for all purposes by this reference.

BACKGROUND OF THE INVENTION

1. Field of the Invention

The present invention relates to a thermal analysis apparatus for measuring thermal behavior accompanying a temperature change of a sample caused by heating the sample.

2. Description of the Related Art

Hitherto, as a technique of evaluating temperature characteristics of a sample, there has been employed a technique called thermal analysis for measuring thermal behavior (physical change) accompanying a temperature change of a sample caused by heating the sample. The thermal analysis includes all such techniques defined in JIS K 0129: 2005 "General rules for thermal analysis," and directed to measuring physical properties of a measurement target (sample) obtained when the temperature of the sample is controlled based on a program. As the thermal analysis, the following five methods are generally used: (1) differential thermal analysis (DTA) in which a temperature (temperature difference) is detected; (2) differential scanning calorimetry (DSC) in which a heat flux difference is detected; (3) thermogravimetry (TG) in which a mass (weight change) is detected; (4) thermomechanical analysis (TMA) in which mechanical characteristics are detected; and (5) dynamic viscoelasticity measurement (DMA).

Meanwhile, in recent years, it is desired to observe a state of a sample during thermal analysis, and there is known a thermal analyzer in which a heating furnace configured to heat the sample has formed therein an opening, through which the sample is observable (see, for example, Japanese Patent Application Laid-open No. 2015-108540).

There is also reported a technology in which, when a temperature of an image of a sample that is being heated is specified, color information of the image is displayed in RGB values along with the image (Rigaku homepage, "Press releases," "Rigaku launches new software optimized for sample-observing TG-DTA and DSC," [online], May 11, 2016, Internet, <URL: https://www.rigaku.co.jp/rigaku.com/arrival/160511.html>: hereinafter referred to as Non-Patent Literature 1).

However, in the case of the technology described in Non-Patent Literature 1, the RGB values of the image of the temperature at one point selected by a user are merely displayed on a separate window on a computer screen, and there is a problem that continuous changes of RGB accompanying a temperature change cannot be grasped.

For example, when a phenomenon or thermal behavior that is hard to judge occurs during the thermal analysis, it is useful to grasp a temperature at which a color change of the sample starts and an amount of color change, but it is difficult to grasp such information based solely on the RGB values at the temperature at one point in time. In the case of the technology described in Non-Patent Document 1, in particular, there is no choice but to judge a point of color change of the sample based on a sense of an analyst, and there is a fear that an analysis result may vary.

SUMMARY OF THE INVENTION

The present invention has been made to solve the above-mentioned problem, and therefore has an object to provide a thermal analysis apparatus with which, through comparing a change in color information accompanying a temperature change of a sample against thermal behavior, a thermal change of the sample can be grasped more correctly.

In order to achieve the above-mentioned object, the present invention provides a thermal analysis apparatus, which is configured to measure thermal behavior accompanying a temperature change of a sample in a heating furnace, the thermal analysis apparatus including: the heating furnace having an opening, through which the sample is observable; thermal behavior measurement means for measuring the thermal behavior; imaging means for capturing image data of the sample in the heating furnace through the opening; storage means for storing the thermal behavior and the image data with respect to a temperature; control means; and image processing means for generating predetermined color information based on the image data, the control means being configured to instruct the image processing means to generate the predetermined color information with respect to a plurality of temperatures, and cause predetermined display means to display a plurality of pieces of the predetermined color information and the thermal behavior in superimposition with respect to the plurality of temperatures.

According to the thermal analysis apparatus, the plurality of pieces of color information and the thermal behavior are displayed in superimposition with respect to the temperature, so that a temperature at which the color change of the sample starts and the amount of change are easier to grasp. Further, the point of color change (temperature of change) of the sample can be clearly grasped as a graph, and it is possible to prevent the variation in analysis result depending on the analyst.

Still further, a case in which only the color information changes while the thermal behavior does not change, a case in which it is desired to evaluate the effect of the temperature in terms of not only the thermal behavior but also the color change, or another physical phenomenon that cannot be measured by the measurement of the thermal behavior can be grasped.

As described above, through comparing the change in color information accompanying the temperature change of the sample against the thermal behavior, the thermal change of the sample can be grasped more correctly.

The thermal analysis apparatus of the present invention may further include input means, wherein, when a user specifies, through the input means, a piece of the predetermined color information to be displayed on the predetermined display means, the control means may cause the predetermined display means to display the specified piece of the predetermined color information.

According to the thermal analysis apparatus, a plurality of kinds of color information can be displayed.

In the thermal analysis apparatus of the present invention, when the user specifies, through the input means, one of color information to be kept on display and color information to be removed from display from among the predetermined color information displayed on the predetermined display means, the control means may cause the predetermined display means to stop displaying the color information to be removed from display.

According to the thermal analysis apparatus, color information with which the color change of the sample is easy to grasp is determined from among the plurality of kinds of color information that are displayed, and hence it is easier to grasp the temperature at which the color change of the sample starts and the amount of change.

In the thermal analysis apparatus of the present invention, the predetermined color information may be at least one selected from the group consisting of RGB values, a CIE Lab color system, and CMYK values.

According to the present invention, the thermal analysis apparatus can be obtained, in which through comparing the change in color information accompanying the temperature change of the sample against the thermal behavior, the thermal change of the sample can be grasped more correctly.

DESCRIPTION OF THE EMBODIMENTS

In the following, an embodiment of the present invention is described with reference to the accompanying drawings. Note that, a side close to a tip end portion 9a of a furnace tube 9 along an axial direction O is referred to as "tip end (side)", and the opposite side is referred to as "rear end (side)".

Figure 1:
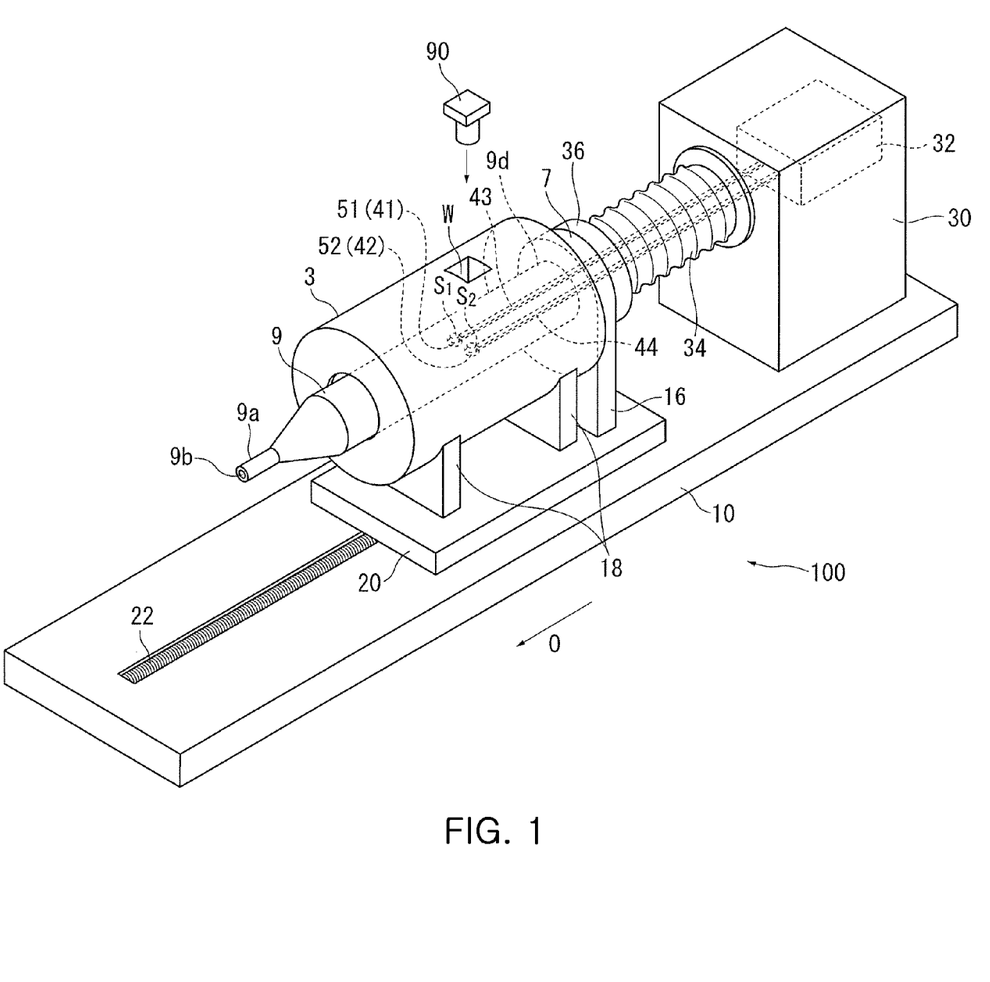
FIG. 1 is a perspective view for illustrating a configuration of a thermal analysis apparatus according to an embodiment as an example of the present invention.
Figure 2:
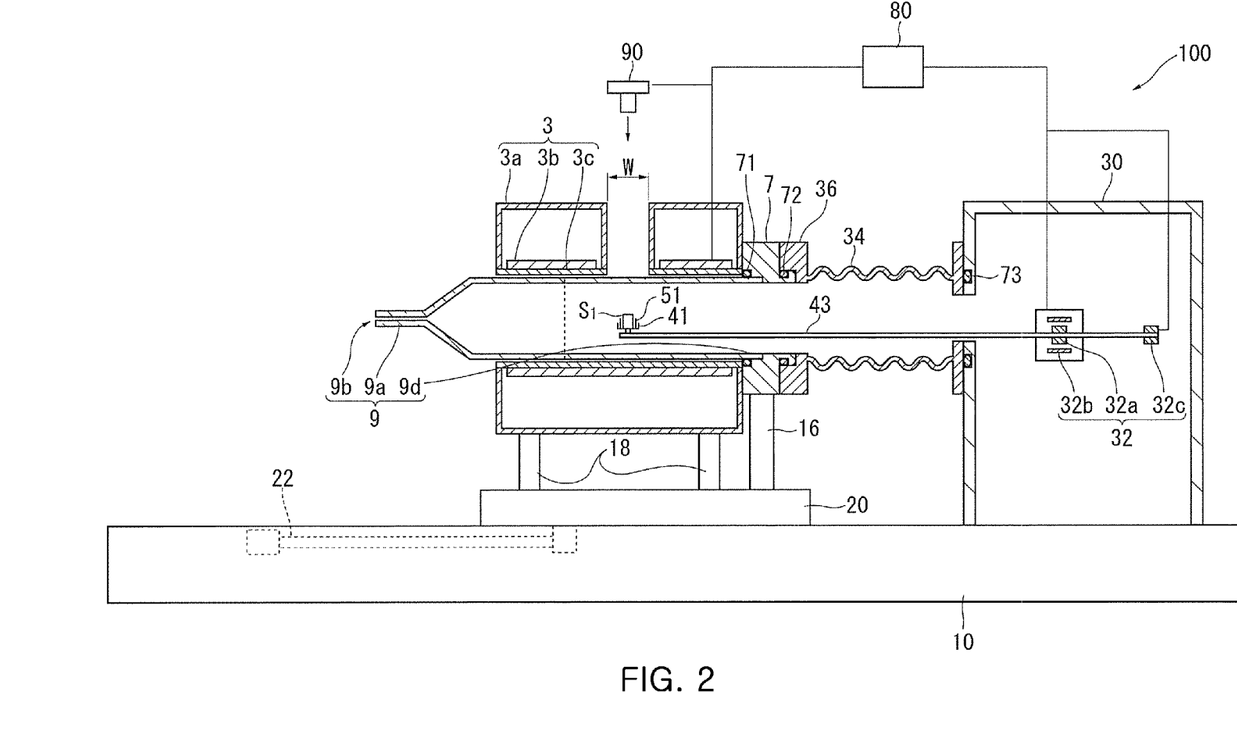
FIG. 2 is a sectional view taken along the line A-A of FIG. 1.

FIG. 1 is a perspective view for illustrating a configuration of a thermal analysis apparatus 100 according to the embodiment as an example of the present invention. FIG. 2 is a sectional view taken along the line A-A of FIG. 1.

The thermal analysis apparatus 100 serves as a thermogravimetry (TG) apparatus, and includes the cylindrical furnace tube 9, a cylindrical heating furnace 3 which externally surrounds the furnace tube 9, a pair of sample holders 41 and 42 which are arranged inside the furnace tube 9, a support base 20, a measurement chamber 30 which is connected to a rear end portion 9d of the furnace tube 9 in the axial direction O, a weight detector 32 which is arranged inside the measurement chamber 30 and is configured to measure weight changes of samples $S_1$ and $S_2$, a base 10 having a top surface on which the measurement chamber 30 is placed, and a computer 80.

Here, the measurement sample (sample) $S_1$ and the reference sample $S_2$ are housed in a pair of sample containers (see FIGS. 2) 51 and 52, respectively, and the sample containers 51 and 52 are placed on the pair of sample holders 41 and 42, respectively. Further, the reference sample $S_2$ is a reference substance (reference) with respect to the measurement sample.

Further, two support columns 18 extend downward from a lower end of the heating furnace 3 in the vicinity of both axial ends thereof, and the support columns 18 are connected to a top surface of the support base 20. Still further, a flange part 7 is fixed on the outer side of the rear end portion 9d of the furnace tube 9, and one support column 16 extends downward from a lower end of the flange part 7. The support column 16 is connected to the top surface of the support base 20. The support column 16 is arranged on a rear end side with respect to a rear end of the support base 20, and does not interfere with the support base 20. The furnace tube 9 may be fixed to the heating furnace 3, and in that case, the support column 16 may be omitted from the structure.

Further, a groove is formed in the base 10 along the axial direction O, and a linear actuator 22 is arranged in the groove. The rear end side of the linear actuator 22 is connected to the support base 20, and the tip end side (or servomotor on the tip end side) is connected to the base 10. The support base 20 is reciprocable by the linear actuator 22 in the axial direction O along the above-mentioned groove.

The linear actuator 22 is formed of, for example, a ball screw and a servomotor, but any known actuator configured to be linearly driven in the axial direction O may be used therefor.

The heating furnace 3 includes a cylindrical core tube 3c forming an inner surface of the heating furnace 3, a heater 3b fitted onto the core tube 3c, and a cylindrical outer cylinder 3a having side walls on both ends thereof (see FIG. 2). At the center of each side wall of the outer cylinder 3a, a center hole is formed so as to insert the core tube 3c therethrough. The outer cylinder 3a surrounds the heater 3b to maintain the temperature of the heating furnace 3, and the outer cylinder 3a may have an adjustment hole (not shown) as appropriate to adjust the temperature of the heating furnace 3. The inner diameter of the core tube 3c is larger than the outer diameter of the furnace tube 9, and the heating furnace 3 is configured to heat the furnace tube 9 (and the samples $S_1$ and $S_2$ inside the furnace tube 9) in a non-contact manner.

Further, in a top surface of the heating furnace 3, a substantially rectangular opening W is formed to penetrate from the outer cylinder 3a toward the core tube 3c.

The furnace tube 9 is reduced in diameter to have a tapered shape toward the tip end portion 9a. The tip end portion 9a is formed into an elongated capillary shape, and has a gas discharge port 9b opened at its tip end. A purge gas is introduced into the furnace tube 9 from the rear end side as appropriate, and the purge gas, decomposition products generated from the samples due to heating, and the like are discharged to the outside through the gas discharge port 9b. On the other hand, on the outer side of the rear end portion 9d of the furnace tube 9, the ring-like flange part 7 is fixed through an intermediation of a seal member 71 (see FIG. 2).

Further, the furnace tube 9 is made of a transparent material, and hence the samples $S_1$ and $S_2$ are observable from outside the furnace tube 9. The transparent material herein refers to a material which allows visible light to pass therethrough at a predetermined light transmittance, and includes a semi-transparent material. Further, as the transparent material, quartz glass, sapphire glass, or YAG (iridium/aluminum/garnet) ceramics may be used suitably.

Balance arms 43 and 44 extending in the axial direction O toward the rear end side are connected to the sample holders 41 and 42, respectively, and the balance arms 43 and 44 are arranged in a horizontal direction. Further, thermocouples are arranged immediately below the sample holders 41 and 42, and hence the temperatures of the samples can be measured. The balance arms 43 and 44 and the sample holders 41 and 42 are each made of, for example, platinum.

The measurement chamber 30 is arranged at the rear end of the furnace tube 9, and a tube-like bellows 34 extending in the axial direction O toward the tip end side of the furnace tube 9 is fixed to the tip end portion of the measurement chamber 30 through an intermediation of a seal member 73. The tip end side of the bellows 34 forms a flange part 36, and the flange part 36 is hermetically connected to the flange part 7 through an intermediation of a seal member 72. In this manner, the measurement chamber 30 and the furnace tube 9 communicate internally to each other, and the rear ends of the balance arms 43 and 44 extend to the interior of the measurement chamber 30 through the furnace tube 9. Note that, as the seal members 71 to 73, for example, an O-ring or a gasket may be used.

As illustrated in FIG. 2, the weight detector 32 arranged inside the measurement chamber 30 includes coils 32a, magnets 32b, and position detecting parts 32c. The position detecting parts 32c are each formed of, for example, a photosensor, and are arranged on the rear end side of the balance arms 43 and 44 to detect whether or not the balance arms 43 and 44 are held in a horizontal state. On the other hand, the coils 32a are fixed to axial centers (fulcrums) of the balance arms 43 and 44, and the magnets 32b are arranged on both sides of each coil 32a. A current is caused to flow through the coils 32a so that the balance arms 43 and 44 assume a horizontal state, and the current is measured, to thereby measure the weights of the respective samples $S_1$ and $S_2$ at the tip ends of the balance arms 43 and 44. The weight detector 32 is provided to each of the balance arms 43 and 44.

Note that, as illustrated in FIG. 2, the "measurement position" refers to such a position that the flange part 36 and the flange part 7 are hermetically connected to each other and the heating furnace 3 covers the sample holders 41 and 42 (that is, samples $S_1$ and $S_2$) of the furnace tube 9.

Figure 3:
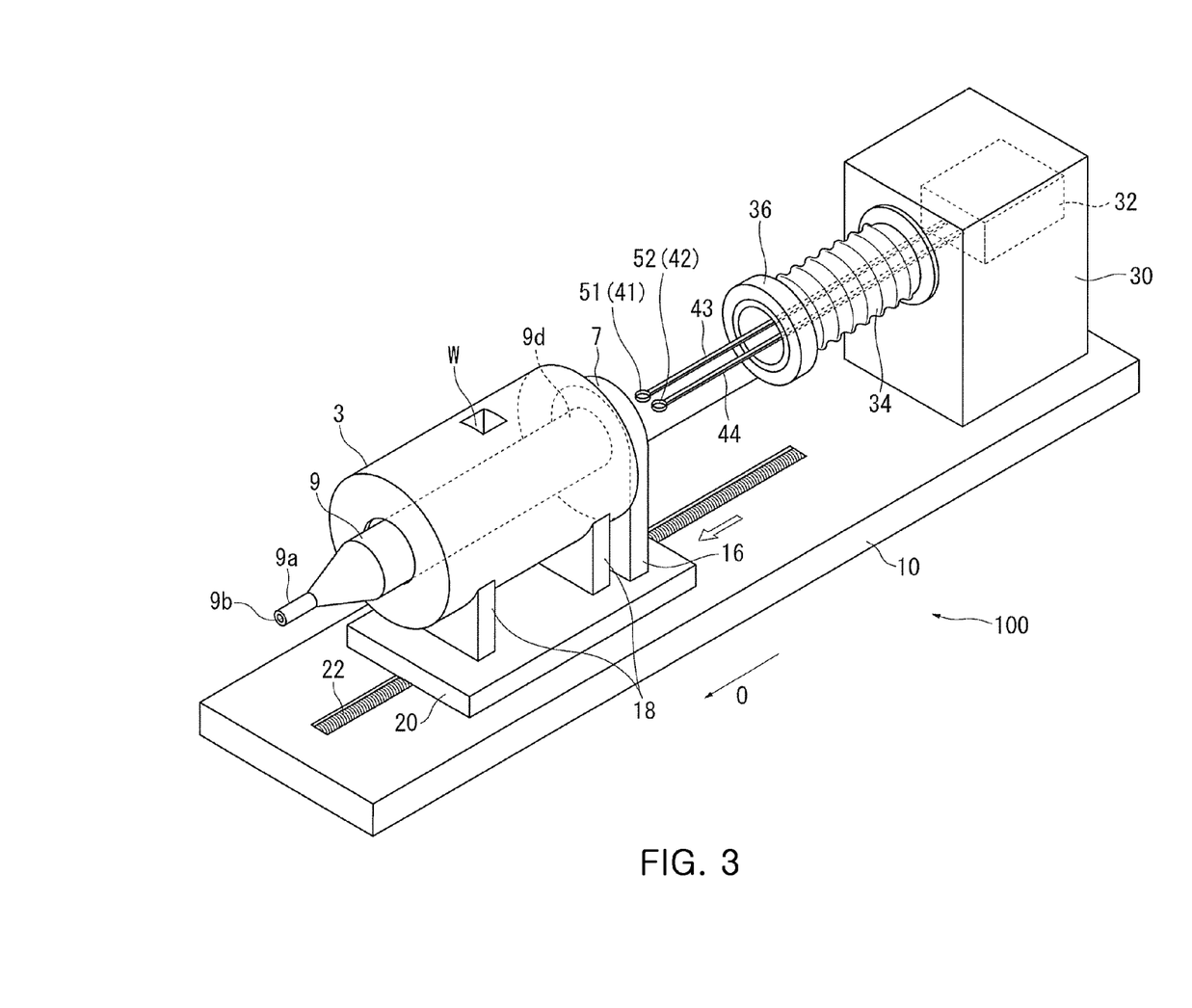
FIG. 3 is a view for illustrating a mode in which a sample is set or replaced in the thermal analysis apparatus.

FIG. 3 is an illustration of positions of the heating furnace 3 and the furnace tube 9 in a case of setting the samples $S_1$ and $S_2$ in the sample containers 51 and 52 on the sample holders 41 and 42, respectively, or replacing the samples $S_1$ and $S_2$. When the samples $S_1$ and $S_2$ are set (placed) or replaced, the support base 20 is advanced by the linear actuator 22 toward the tip end side of the furnace tube 9 (left side of FIG. 3). Then, the furnace tube 9 and the heating furnace 3 fixed to the support base 20 are advanced toward the tip end side with respect to the above-mentioned measurement position to expose the sample holders 41 and 42 on the rear end side with respect to the furnace tube 9 and the heating furnace 3 so that the samples $S_1$ and $S_2$ can be set or replaced.

A position at which, as illustrated in FIG. 3, the flange part 36 and the flange part 7 are separated from each other in the axial direction O and the sample holders 41 and 42 (that is, samples $S_1$ and $S_2$) are exposed on the rear end side with respect to the furnace tube 9 and the heating furnace 3 is referred to as "sample setting position."

Figure 4:
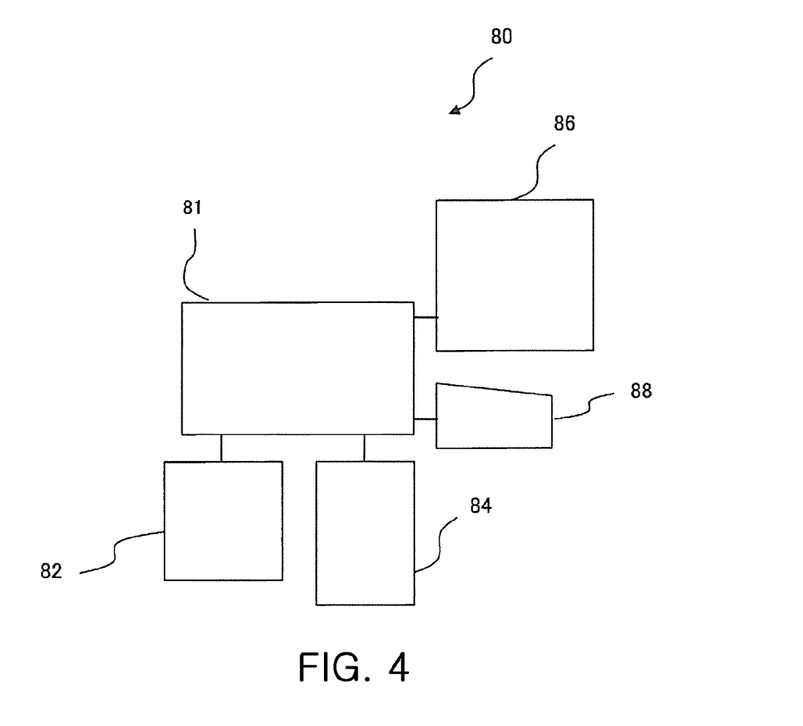
FIG. 4 is a diagram for illustrating a configuration of a computer including control means.

As illustrated in FIG. 4, the computer 80 includes a CPU 81 configured to control the entire apparatus, an image processing unit 82, a storage means 84 such as a hard disk, a display means 86 such as a liquid crystal monitor, an input means 88 such as a keyboard, and other components.

The CPU 81 includes a RAM and a ROM (both of which are not shown), and is configured to measure thermal behavior accompanying a temperature change of the sample during thermal analysis, and to perform display control, which is to be described later.

The image processing unit 82 is configured to generate predetermined color information based on image data captured by imaging means 90, which is to be described later.

The storage means 84 is configured to store the thermal behavior and the image data with respect to a temperature.

The display means 86 is configured to display predetermined information, and the input means 88 is configured to receive an instruction from a user.

The CPU 81 corresponds to "thermal behavior measurement means" and "control means" in the scope of claims, and the image processing unit 82 corresponds to "image processing means" in the scope of claims.

In this example, the image processing unit 82 is a semiconductor specialized in image processing, which is separate from the CPU 81, but the CPU 81 may also execute the function of the image processing unit 82.

The thermal behavior measurement means (CPU) 81 is configured to control the linear actuator 22, the heater 3b, and the weight detector 32 to perform normal thermal analysis.

Specifically, the thermal behavior measurement means 81 is configured to control the power feed to the heater 3b to heat the samples $S_1$ and $S_2$ set in the sample containers 51 and 52 through heating the furnace tube 9 in a predetermined heating pattern. Differential heat and sample temperatures of the samples $S_1$ and $S_2$ during the heating are acquired by thermocouples, which are arranged immediately below the sample holders 41 and 42, respectively, and the thermal behavior (in this example, weight change of the sample) is acquired from the weight detector 32. Further, the thermal behavior measurement means 81 is configured to control movement of the linear actuator 22 to move the heating furnace 3 and the furnace tube 9 to the measurement position and the sample setting position, which are described above.

Here, the opening W may have any dimensions with which at least the measurement sample $S_1$ in the sample container 51 can be visually observed from a direction perpendicular to the axial direction O, and the reference sample $S_2$ may not be visually observable.

Then, a change of the sample $S_1$ (and the sample $S_2$ as required) under the thermal analysis can be observed in the furnace tube 9 by the imaging means (for example, camera, digital camera, video camera, or optical microscope) 90 above the opening W, and image data of the sample $S_1$ (and the sample $S_2$) can be captured. The imaging means 90 includes, for example, a CCD device to capture the image data of the sample.

Figure 5:
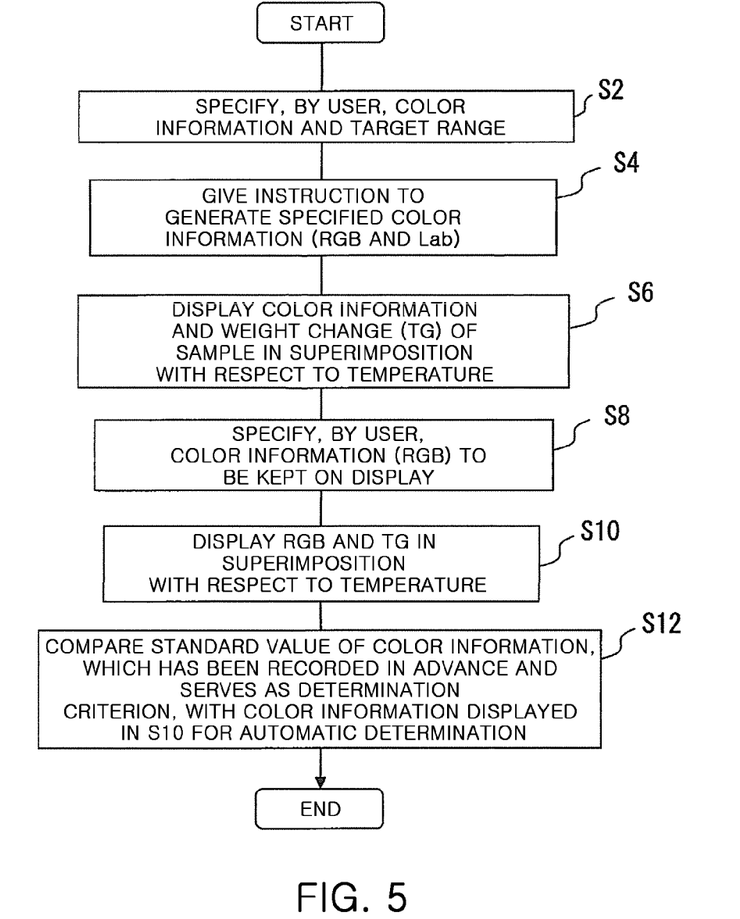
FIG. 5 is a chart for illustrating an example of a flow of control by the control means.

Next, referring to FIG. 5, a characteristic part of the present invention is described.

FIG. 5 is a chart for illustrating an example of a flow of control by the control means (CPU) 81.

As illustrated in FIG. 5, when the user specifies color information and a target range through the input means 88 (Step S2), the control means 81 instructs the image processing unit 82 to generate the specified color information (RGB, Lab) (Step S4).

The "color information" as used herein refers to information obtained by digitizing colors of the image data captured by the imaging means 90, and main examples thereof include: Lab (L*a*b*) values in the CIE (International Commission on Illumination) 1976 color space; RGB values expressing a color in a combination of red, green, and blue, which are called "primary colors of light"; and CMYK values expressing a color in a combination of three colors of cyan, magenta, and yellow, which are called "primary colors of pigment," and black, but the present invention is not limited thereto. Examples of the color information also include XYZ values in the CIE 1931 color space, L*u*v* values in the CIE 1976 color space, and CIECAM02.

The image data is often RGB data, and the RGB values may be acquired based on the RGB data. Further, the Lab values and the CMYK values may be obtained through a known method of conversion from the RGB data, but the present invention is not limited thereto.

In Step S2, the user selects desired color information (in this example, the following two kinds: RGB and Lab) from among, for example, color information (in this example, the following three kinds: RGB, Lab, and CMYK) that can be generated on the apparatus according to the present invention. Further, the "specification of the target range" includes the specification of a temperature range of color information that is desired to be generated, and a place of the image data from which the color information is to be generated.

The target range may not be specified for the temperature, and in this case, the target range is the entire data from a start temperature to an end temperature of the thermal behavior measurement. Meanwhile, an area in the image data from which the color information is to be acquired is specified by the user so as not to include an image of things such as the sample containers other than the sample. In this case, when, for example, the area from which the color information is to be acquired is specified for the first image before heating, the system may automatically apply the specification to the subsequent images (based on coordinate information of edges of the specified image, for example).

Next, the control means 81 causes the display means 86 to display the generated color information (RGB and Lab) and the weight change (TG) of the sample, which is the thermal behavior, in superimposition with respect to the temperature (Step S6).

Looking at a temperature change of the color information displayed on the display means 86, the user determines color information with which a temperature at which a color change of the sample starts and an amount of change are easier to grasp. Then, in Step S8, the user specifies color information (RGB) to be kept on display. The user may specify the color information (RGB) to be kept on display, or specify color information (Lab) not to be displayed (or to be removed from display).

Based on the information of Step S8, the control means 81 causes the display means 86 to display RGB and TG in superimposition with respect to the temperature (Step S10).

Figure 6:
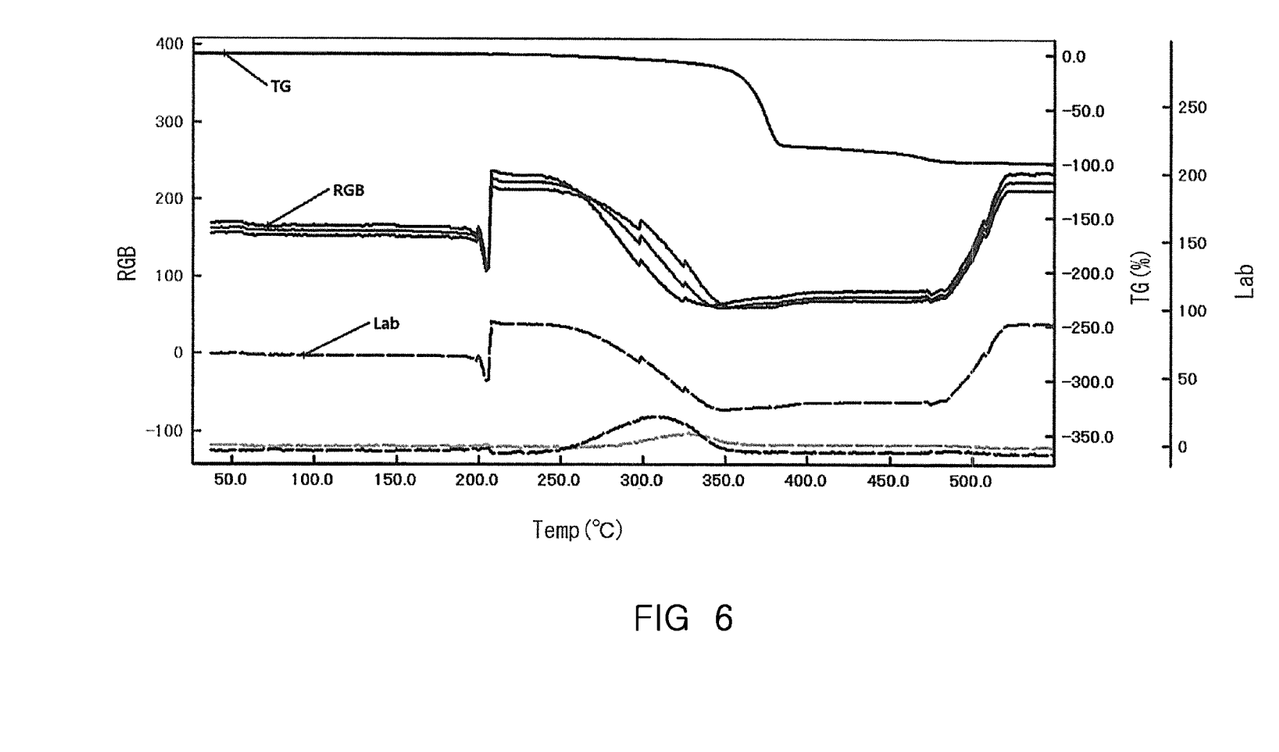
FIG. 6 is a diagram for illustrating an example of a display screen of display means in Step S6 of FIG. 5.
Figure 7:
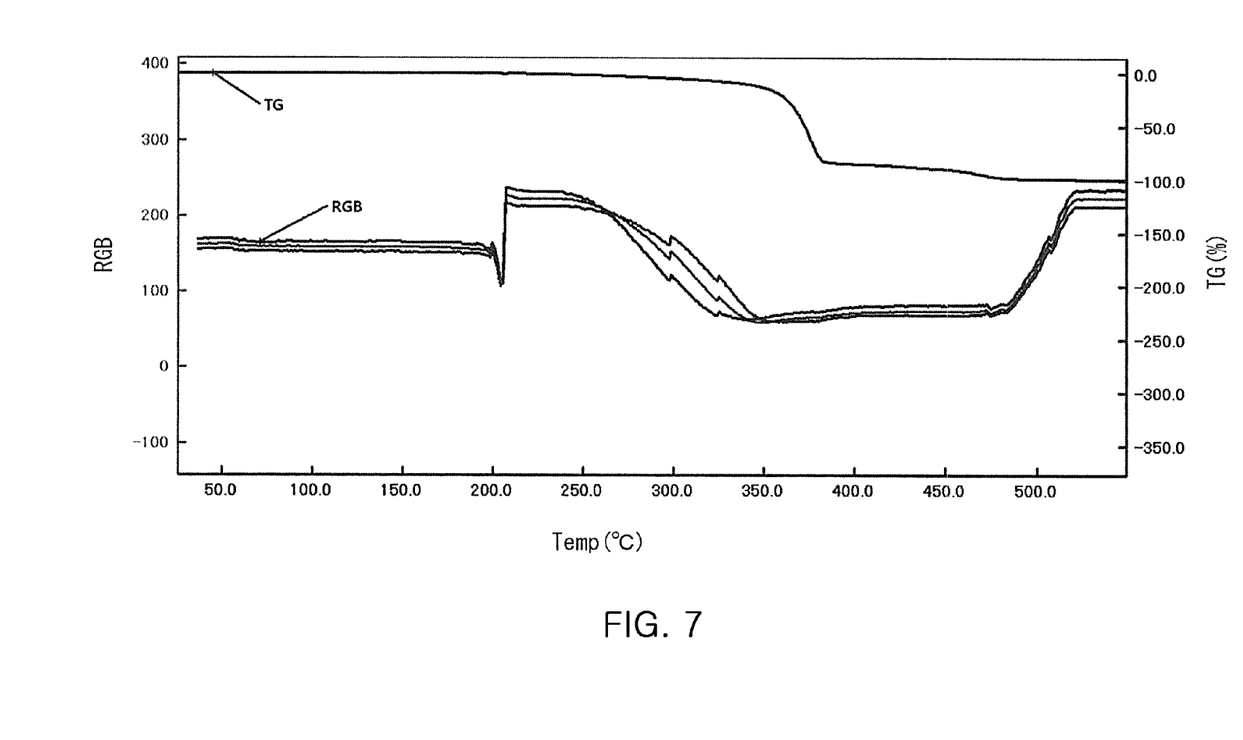
FIG. 7 is a diagram for illustrating an example of the display screen of the display means in Step S10 of FIG. 5.

FIG. 6 and FIG. 7 show examples of a display screen of the display means 86 in Steps S6 and S10, respectively. As the sample, a pharmaceutical (ursodeoxycholic acid) was used. The plurality of pieces of color information and the thermal behavior (TG) are displayed in superimposition with respect to the temperature, so that a temperature at which the color change of the sample starts and the amount of change are easier to grasp. Further, the point of color change (temperature of change) of the sample can be clearly grasped as a graph, and it is possible to prevent the variation in analysis result depending on the analyst.

In the case of the sample of FIG. 6 and FIG. 7, amounts of change of RGB with respect to the temperature were larger than those of Lab, and were found to be easier to grasp the temperature at which the color change of the sample starts and the amounts of change.

In particular, the temperature change of the color information can be grasped in comparison with the temperature change of the thermal behavior, and hence the following useful information can be obtained.

First, a case in which only the color information changes while the thermal behavior does not change as in FIG. 6 and FIG. 7, a case in which it is desired to evaluate the effect of the temperature, such as heat resistance, in terms of not only the thermal behavior but also the color change, evaluation on whether or not a minor component (that is, not shown in the macro thermal behavior in TG, for example) of a mixture is deteriorated (for example, heat deterioration of the surface), or another phenomenon that cannot be measured by the measurement of the thermal behavior can be grasped.

Specifically, in the case of the sample in FIG. 6 and FIG. 7, the color information changes abruptly at about 200° C. This indicates that the color information changed because white powders at room temperature turned into a transparent color after melting. This physical phenomenon is melting, which causes no change in the TG signal, and cannot be grasped with only the TG measurement.

Meanwhile, when both of the thermal behavior and the color information change, the evaluation of heat resistance can be grasped more correctly based on the changes in the thermal behavior and the color information, and correlation between an advance ratio of decomposition reaction and the color change can be grasped. Further, the effects of a composition ratio and types of additives on the color during the decomposition reaction (stability evaluation based on the color) can be grasped.

Figure 8:
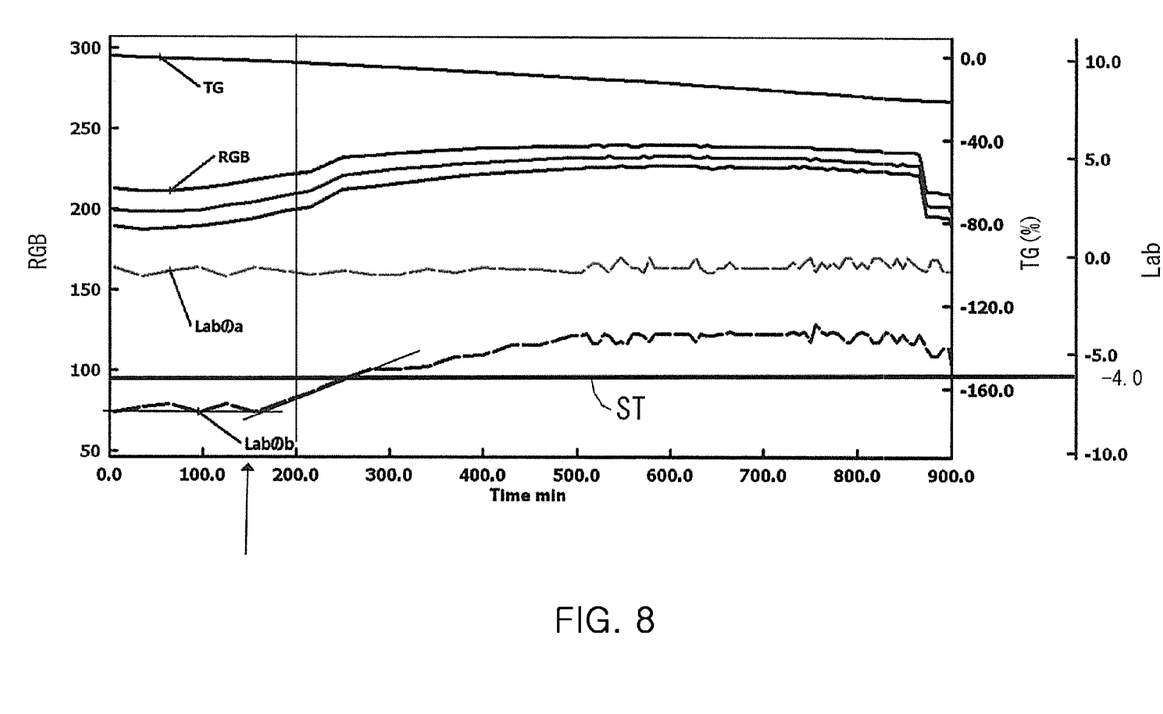
FIG. 8 is a diagram for illustrating graphs of temperature changes of Lab and RGB of a plastic.

As illustrated in FIG. 8, in order to grasp a degree of yellowness of a plastic, Lab is more suitable than RGB.

In other words, "b" of Lab is an indicator of an yellow component, and when focusing attention on the graph of "b", "b" abruptly increases from the arrow portion (about 150° C.) of FIG. 8, which can be clearly grasped to be a point at which yellowing starts. Meanwhile, RGB change continuously with the temperature, and the point at which yellowing starts is hard to judge.

Further, when the color change caused by heat of ink or toner, for example, is to be evaluated, the CMYK values are suitable.

Here, it is assumed that in FIG. 8, the "b" value of Lab suitable for grasping the degree of yellowness of the plastic is plotted as the graph based on Step S10 of FIG. 5. In this case, the user may determine whether or not the plastic has some degree of yellowness from the graph of the "b" value as described above, but the determination may become subjective.

To address this problem, a standard value of the color information, which serves as a determination criterion for the degree of yellowness, may be set on the apparatus, and the "b" value of FIG. 8 may be compared with the standard value so that the control means 81 automatically determines the degree of yellowness of the plastic (Step S12 of FIG. 5).

For example, it is assumed that, as illustrated in FIG. 8, a standard value ST ("b" value=−4.0, the vertical axis at the right end of FIG. 8) of the "b" value as the color information was set, and a temperature (determining temperature) at which the standard value ST was determined was set to 200° C. Then, when an actual value of "b" at the time when the sample temperature was 200° C. is less than the standard value ST in Step S12 of FIG. 5, the control means 81 automatically determines that the plastic has "zero degree of yellowness (passes in heat resistance)," and when the actual value of "b" is the standard value ST or more, the control means 81 automatically determines that the plastic has "some degree of yellowness (fails in heat resistance)." Further, the control means 81 records the result of passage/failure in the storage means 84 as required, and displays the result of passage/failure on the display means 86.

In FIG. 8, the actual "b" value at 200° C. is smaller than the standard value ST, and hence it is determined that the plastic has "no degree of yellowness (passes in heat resistance)."

As a result, the degree of yellowness of the plastic can be determined correctly, and hence it is possible to prevent the variation in determination result depending on the user.

The present invention is not limited to the embodiment described above, and encompasses various modifications and equivalents within the spirit and scope of the present invention.

For example, the thermal analysis apparatus according to the present invention is applicable not only to the thermogravimetry (TG) apparatus described above, but also to thermal analysis of all methods, which are defined in JIS K 0129:2005 "General rules for thermal analysis," and in which physical properties of the sample at the time when a temperature of an object (sample) to be measured is controlled based on a program are measured. Specific examples of the thermal analysis include: (1) differential thermal analysis (DTA) in which the temperature (temperature difference) is detected; (2) differential scanning calorimetry (DSC) in which a heat flux difference is detected; and (3) thermogravimetry (TG) in which a mass (weight change) is detected.

The number of pieces of color information and thermal behavior to be displayed on the display means is not limited as long as the number is plural. Further, temperatures for the color information and the thermal behavior to be displayed on the display means may or may not be the same, and for example, the thermal behavior may be displayed for every 2° C., and the color information may be displayed for every 5° C. In this case, when the measurement range of the temperature is set to a range of from a normal temperature (25° C.) to 600° C., for example, the image data for generating the color information is automatically measured on the apparatus every time the temperature increases by 5° C. from 25° C. In particular, the image data is larger in data amount than the thermal analysis data, and hence it is preferred to set timings to acquire the image data to be longer than timings to acquire the thermal analysis data.

What is claimed is:

1. A thermal analysis apparatus, which is configured to measure thermal behavior accompanying a time series change in a temperature of a sample in a heating furnace during a thermal analysis, the thermal analysis apparatus comprising:
   the heating furnace having an opening, through which the sample is observable;
   thermal behavior measurement means for measuring the thermal behavior;
   imaging means for capturing image data of the sample in the heating furnace through the opening;
   storage means for storing the thermal behavior and the image data with respect to a temperature;
   control means; and
   image processing means for generating predetermined color information based on the image data,
   the control means being configured to instruct the image processing means to generate the predetermined color information with respect to a plurality of temperatures, and cause predetermined display means to display a plurality of pieces of the predetermined color information and the thermal behavior in superimposition with respect to the plurality of temperatures such that a change in the predetermined color information and a change in the thermal behavior according to the time series change in the temperature of the sample during the thermal analysis are displayed in superimposition.

2. The thermal analysis apparatus according to claim 1, further comprising input means,
   wherein, when a user specifies, through the input means, a piece of the predetermined color information to be displayed on the predetermined display means, the control means causes the predetermined display means to display the specified piece of the predetermined color information.

3. The thermal analysis apparatus according to claim 2, wherein, when the user specifies, through the input means, one of color information to be kept on display and color information to be removed from display from among the predetermined color information displayed on the predetermined display means, the control means causes the predetermined display means to stop displaying the color information to be removed from display.

4. The thermal analysis apparatus according to claim 3, wherein the predetermined color information is at least one selected from the group consisting of RGB values, a CIE Lab color system, and CMYK values.

5. The thermal analysis apparatus according to claim 2, wherein the predetermined color information is at least one selected from the group consisting of RGB values, a CIE Lab color system, and CMYK values.

6. The thermal analysis apparatus according to claim 1, wherein the predetermined color information is at least one selected from the group consisting of RGB values, a CIE Lab color system, and CMYK values.

* * * * *